United States Patent
Kida

[19]

[11] Patent Number: 6,112,455
[45] Date of Patent: Sep. 5, 2000

[54] SUPPORT MEMBER FOR SUPPORTING BASE OF TREE FOR USE IN OPERATION FOR SUPPORTING TREE AND METHOD OF SUPPORTING TREE BY USING SAID SUPPORT MEMBER

[75] Inventor: Yukio Kida, Osaka, Japan

[73] Assignee: Toho Leo Kabushiki Kaisha, Osaka, Japan

[21] Appl. No.: 08/942,716

[22] Filed: Oct. 2, 1997

[30] Foreign Application Priority Data

| Mar. 18, 1996 | [JP] | Japan | 8-61276 |
| Jun. 28, 1996 | [JP] | Japan | 8-169971 |
| Oct. 9, 1996 | [JP] | Japan | 8-268528 |
| Mar. 7, 1997 | [JP] | Japan | 9-053125 |
| May 15, 1997 | [JP] | Japan | 9-125569 |

[51] Int. Cl.⁷ ............. A01G 23/02; A01G 5/00
[52] U.S. Cl. ............. 47/42; 47/74; 47/41.14
[58] Field of Search ............. 47/42, 47, 41.14, 47/30, 74, 67

[56] References Cited

U.S. PATENT DOCUMENTS

| 3,930,334 | 1/1976 | Johnston | 47/67 |
| 4,658,737 | 4/1987 | Weissberg | 47/42 |
| 4,848,027 | 7/1989 | Skierwiderski | 47/42 |
| 4,894,950 | 1/1990 | Yukio et al. | 47/42 |
| 5,129,179 | 7/1992 | Kronmiller | 47/42 |
| 5,402,600 | 4/1995 | Tompkins | 47/42 |
| 5,471,783 | 12/1995 | McLean | 47/30 |
| 5,542,210 | 8/1996 | Hupfl | 47/47 |

*Primary Examiner*—Peter M. Poon
*Assistant Examiner*—Elizabeth Shaw
*Attorney, Agent, or Firm*—Arent Fox Kintner Plotkin & Kahn, PLLC

[57] ABSTRACT

A support member and method for supporting the base of a tree. The support member tightens around the base of the tree to support the tree and includes a support member body that can suspend the state where the base of the tree is tightened in a time-dependent manner after a lapse of years corresponding to growth of the tree. The method includes the step of placing the support member around the base of the tree wherein the support member has a support member body that is capable of self-terminating support at the base of the tree in the time-dependent manner to correspond to growth of the tree.

37 Claims, 10 Drawing Sheets

FIG.1A
FIG.1B
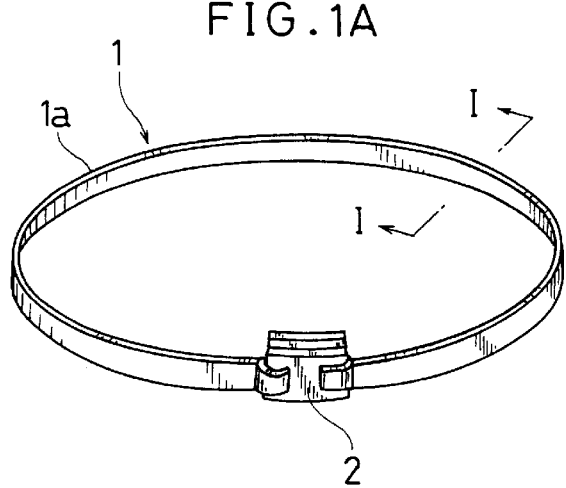
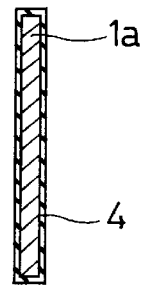
FIG.2
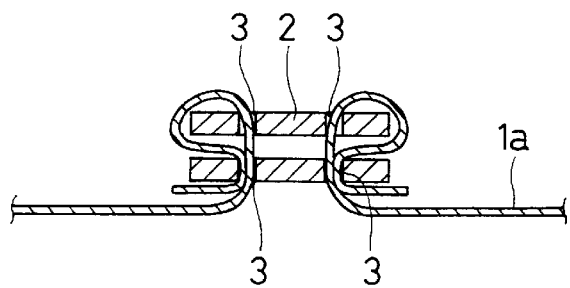
FIG.3
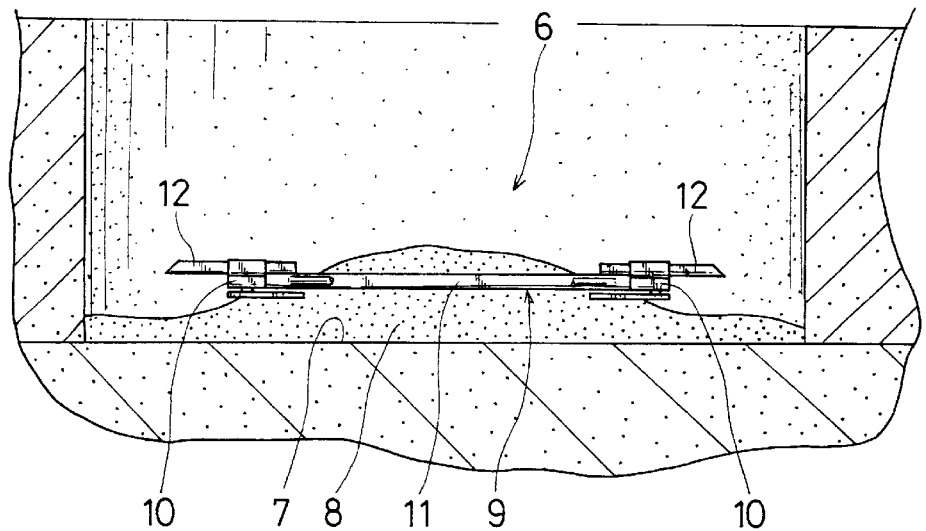

SUPPORT MEMBER FOR SUPPORTING BASE OF TREE FOR USE IN OPERATION FOR SUPPORTING TREE AND METHOD OF SUPPORTING TREE BY USING SAID SUPPORT MEMBER

BACKGROUND OF THE INVENTION

1. Field of the Invention

The present invention relates to a member for supporting the base of a tree for use in an operation for supporting a tree and a method of supporting a tree by using the support member, and more particularly to a method of supporting a tree in such a way that a root pod for receiving the tree is embedded in the earth and to a support member for supporting the base of the tree.

2. Discussion of the Background

In general, a method of supporting a tree of the foregoing type includes the steps of accommodating a root pod in a hole previously formed in the ground to receive the tree, winding a support member around the base of the tree, winding tension wires, secured by the support member, around the root pod, securing the tension wires to anchors driven in the bottom wall surface of the hole for receiving the tree, and stressing the tension wires so that the tree is supported and secured.

Since the support member for supporting the base of the tree for use in the above-mentioned method serves as a supporting point of the overall supporting structure, the structure of the support member and method of setting the support member on the base of the tree are essential factors.

Since the above-mentioned support member is wound around the base of a tree and arranged to tighten the base as time elapses, there arises the following antithetic problems.

To reliably perform the supporting operation, it is preferable that predetermined force for tightening the base of a tree be maintained. In the foregoing viewpoint, it is preferable that the support member be wound around fittingly to the base of the tree.

However, the overall diameter of the trunk is enlarged as the tree grows, thus resulting in that the diameter of the base being also enlarged. Therefore, if the support member is fittingly wound around the base from the beginning, the support member unintentionally and excessively bites the base of the tree.

If the support member is loosely wound around the base of the tree from the beginning in such a manner that the diameter of the support member is made to be larger than that of the base of the tree in expectation of the growth of the tree, a sufficient force to support the tree cannot be obtained.

Since the above-mentioned method of supporting a tree uses the tension wires and anchors to support the tree, the position at which the support member is wound around serves as the supporting point of the overall structure for supporting the tree. Therefore, if inclining and falling force act on the tree, and the support member is loosely wound around the base of the tree, the supporting point in the base of the tree, that is, the supporting point of the structure for supporting the tree is moved because the stress is moved by the distance within a difference in diameter between the support member and the tree. As a result, even the tension wires will loosen, thus causing the function of the supporting structure to deteriorate.

Even if the support member is loosely wound around the base of the tree, the problem that the support member bites the base of the tree as the tree grows cannot be avoided.

The above-mentioned antithetic problems cannot simultaneously be avoided.

SUMMARY OF THE INVENTION

In view of the foregoing, an object of the present invention is to maintain a proper winding and supporting state adaptable to the growth of a tree in such a manner that the force for tightening a support member around the base of the tree can be maintained and biting of the tree can be prevented.

According to one aspect of the present invention, there is provided a method of supporting a tree operation such that the base of the tree is tightened so as to be supported, the method including the step of suspending or terminating the state where a support member is tightened around the base of the tree in a time dependent manner to correspond to growth of the tree.

According to another aspect of the present invention, there is provided a support member for supporting the base of a tree for use in an operation for supporting the tree such that the support member tightens around the base of the tree to support the tree, the support member including: a support member body being capable of suspending or terminating the state where the base of the tree is tightened in a time dependent manner after a lapse of years to correspond to growth of the tree.

The means for suspending or terminating the state where a support member is tightened around the base of the tree in a time dependent manner is means in which the support member is covered with a protective member which is able to deteriorate to correspond to the years of growth of the tree and the support member body is made of a decomposable material.

The protective member which is able to deteriorate to correspond to the years of growth of the tree is made of, for example, thermoplastic polyurethane.

Another means for suspending the state where the base of the tree is tightened in a time dependent manner is means in which at least a portion of the support member contains thermoplastic polyurethane.

The thermoplastic polyurethane is mixture of polyether thermoplastic polyurethane containing polyether polyol or polyester thermoplastic polyurethane containing polyester polyol and polyether thermoplastic polyurethane.

Another means for suspending or terminating the state where the base of the tree is tightened in a time dependent manner is means in which a connection member, which can be separated in a time dependent manner to correspond to the years of growth of the tree, is attached to the support member body.

Another means for suspending or terminating the state where the base of the tree is tightened in a time limit manner is a time-dependent device having a timer.

The support member body may be formed into a flat-belt shape.

The support member body may be subjected to a process with which the decomposition time can be prolonged to correspond to the years of growth of the tree. The process with which the decomposition time can be prolonged to correspond to the years of growth of the tree is, for example, a water-proofing process or a water repellent process.

Another means for suspending or terminating the state where the base of the tree is tightened in a time dependent manner is means in which the support member body is provided with separating means, and the separating means is arranged to be operated by receiving pressure from the base of the growing tree so that the support member body is cut by the separating means.

According to the present invention, there is provided the support member to be wound around the base of a tree when the tree is required to be supported. The support member body is structured such that the state of tightening is suspended or terminated in a time dependent manner to correspond to the years of growth of the tree. Therefore, the support member does not undesirably bite the base of the tree after the diameter of the grown tree has been enlarged. Thus, various problems occurring because of biting can be prevented.

That is, unsatisfactory growth of the tree caused from biting of the support member can be prevented. Moreover, a desirable effect can be obtained in that a complicated operation for cutting the support member to correspond to the growth of the tree to prevent biting of the support member can be omitted.

When the protective member which is able to deteriorate to correspond to the years of growth of the tree is applied to the support member body made of the decomposable material, the protective member is able to adjust the decomposition time even if the support member body is decomposed earlier than a predetermined time. Thus, the support member can be decomposed as required.

In a case where thermoplastic polyurethane is employed as the protective member, the linkages in the polyol portion can easily be broken if the thermoplastic polyurethane is subjected to hot and wet conditions state. Although the linkages do not immediately cause the protective member to be decomposed, the physical properties of the protective member deteriorate. Thus, the protective member gradually deteriorates. Therefore, the support member is not decomposed in a short period of time and the decomposition time can be adjusted as required.

In a case where the support member body is formed into the flat-belt shape, the operation for connecting the ends of the support member body can easily be performed as compared with, for example, the support member body being in the form of a rope. When the support member body is placed on the root pod, the area of the support member body which is in contact with the root pod is relatively small. If the root pod contains water, a considerable time is required for water to be introduced into the support member body of this shape. Thus, a desirable effect can be obtained in that excessively rapid decomposition due to rot caused from water can be prevented. Therefore, a desirable effect can be obtained in that the quality of the appearance of the support member can be maintained because the diameter of the support member body is not needed to be enlarged.

When the support member body is subjected to the process with which the decomposition time can be prolonged to correspond to the years of growth of the tree, introduction of water into the support member body can be somewhat prevented. As a result, excessive shortening of the time at which the support member body is decomposed can be prevented. Thus, a desirable effect can be obtained in that the support member body can be decomposed at a proper time to correspond to the years of growth of the tree.

If the support member body is provided with separating means in such a manner that the separating means is arranged to be pressed by the base of the growing tree so as to be operated to separate the support member body, the structure in which the tree operates the separating means to separate the support member body enables the standing state to be maintained until the roots of the tree are spread. After the tree has grown to spread the roots, that is, after the base of the tree has been brought into contact with the support member, the support member body can reliably be separated.

BRIEF DESCRIPTION OF THE DRAWINGS

The above, and other objects, features and advantages of the present invention will become apparent from the detailed description thereof in conjunction with the accompanying drawings wherein.

FIG. 1A is a schematic perspective view, and

FIG. 1B is an enlarged cross sectional view taken along line I—I of FIG. 1A, respectively showing a support member in accordance with one embodiment of the present invention.

FIG. 2 is an enlarged cross sectional view showing an essential portion of a portion for fixing a support member body.

FIG. 3 is a partial side cross sectional view showing a process for placing a pod retainer on a bottom surface of a hole for receiving the tree.

DETAILED DESCRIPTION OF THE PREFERRED EMBODIMENT

Embodiment 1

Figure 4:
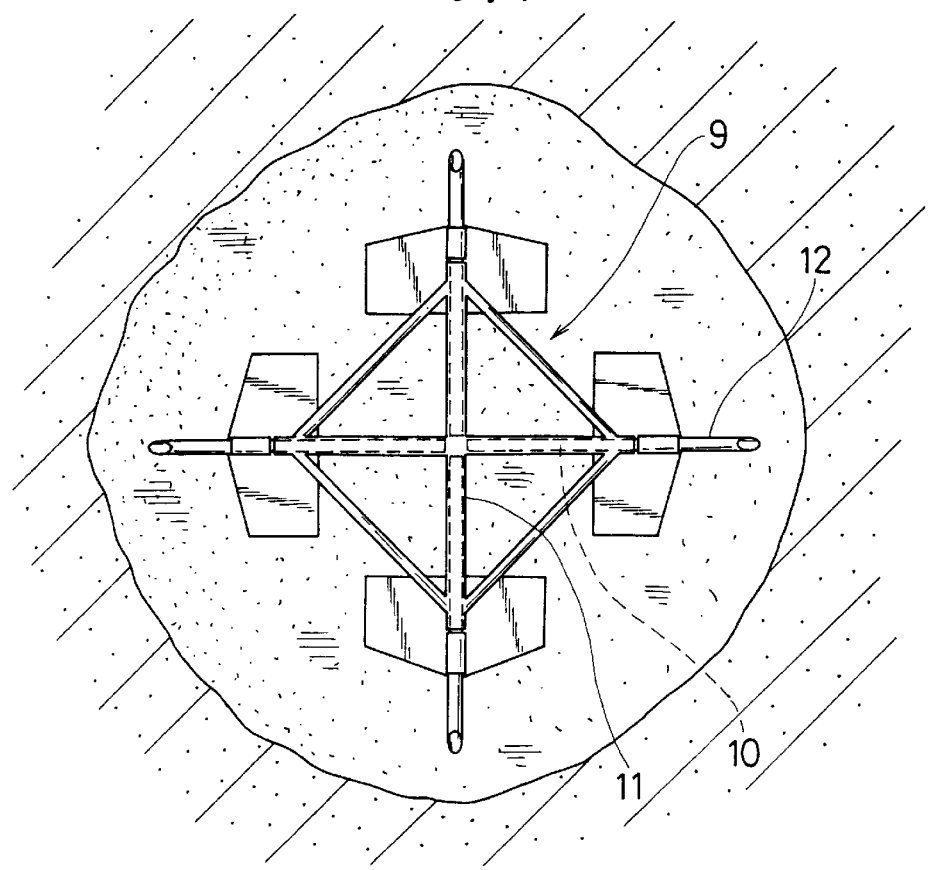
FIG. 4 is a partial side cross sectional view showing a process for placing the pod retainer on the bottom surface of the hole for receiving the tree.

A support member 1 to be attached to the base of a tree which must be supported has a support member body 1a formed into a substantially flat-belt shape as shown in FIG. 1 and made of hemp.

Reference numeral 2 represents a connection member having a function serving as a buckle for connecting the two ends of the support member body 1a together and adjusting the length of the support member body 1a. As shown in FIG. 2, both ends of the support member body 1a are inserted into a plurality of openings 3 formed in the connection member 2 so that the support member body 1a is fastened.

Reference numeral 4 represents a protective member made of thermoplastic polyurethane elastomer with which the surface of the support member body 1a is coated. Thus, the support member body 1a is processed in such a manner as to deteriorate as the tree grows.

Specifically, the thermoplastic polyurethane elastomer can be obtained from a raw material composed of polyol, diol and diisocyanate in such a way that polyol and diol are caused to additionally react with diisocyanate so as to be formed into linear polymers. In this case, polyol forms soft portions (soft segments) of the elastomer, while diisocyanate and diol form hard portions (hard segments) of the elastomer.

In this embodiment, 90% by weight of polyether thermoplastic polyurethane elastomer in a mixture with 10% by weight of polyester thermoplastic polyurethane elastomer is used as the thermoplastic polyurethane elastomer. The polyether thermoplastic polyurethane elastomer is prepared by using polyether polyol as polyol, and the polyester thermoplastic polyurethane elastomer is prepared by using polyester polyol as polyol.

The support member 1 having the above-mentioned structure is used in a winding state by installing the same around the base of the tree when the operation for supporting the tree is performed.

The case in which the support member 1 is installed in the winding state around the base of the tree required to be supported will now be described together with one embodiment of a method of supporting the tree.

Figure 5:
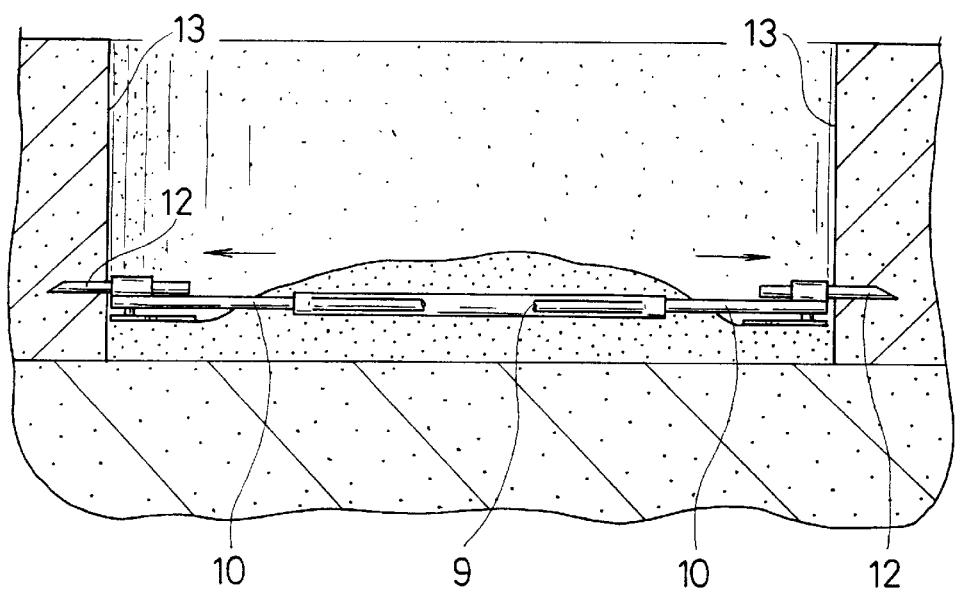
FIG. 5 is a partial cross sectional plan view showing a process for driving piles into the side surface.
Figure 6:
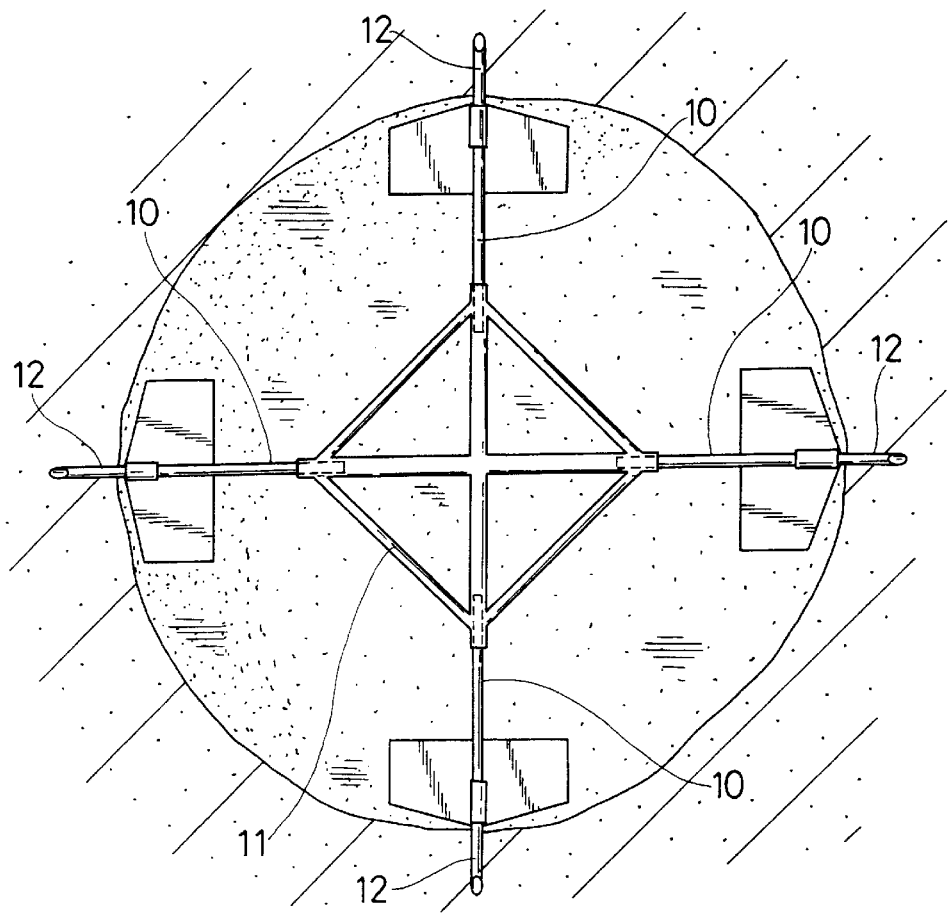
FIG. 6 is a partial cross sectional plan view showing a process for driving the piles into the side surface.

Initially, soil 8 is placed on the bottom surface 7 of a hole 6 for receiving a tree formed previously as shown in FIG. 3, and then a pod retainer 9 is placed on the soil 8, as shown in FIGS. 3 and 4. Then, four slide rods 10 of the pod retainer 9 are slid outwards to expand a retainer body 11, and then four piles 12 secured to the top surfaces of the leading ends of the slide rods 10 are driven into an inner wall 13 of the hole 6, as shown in FIGS. 5 and 6.

Figure 7:
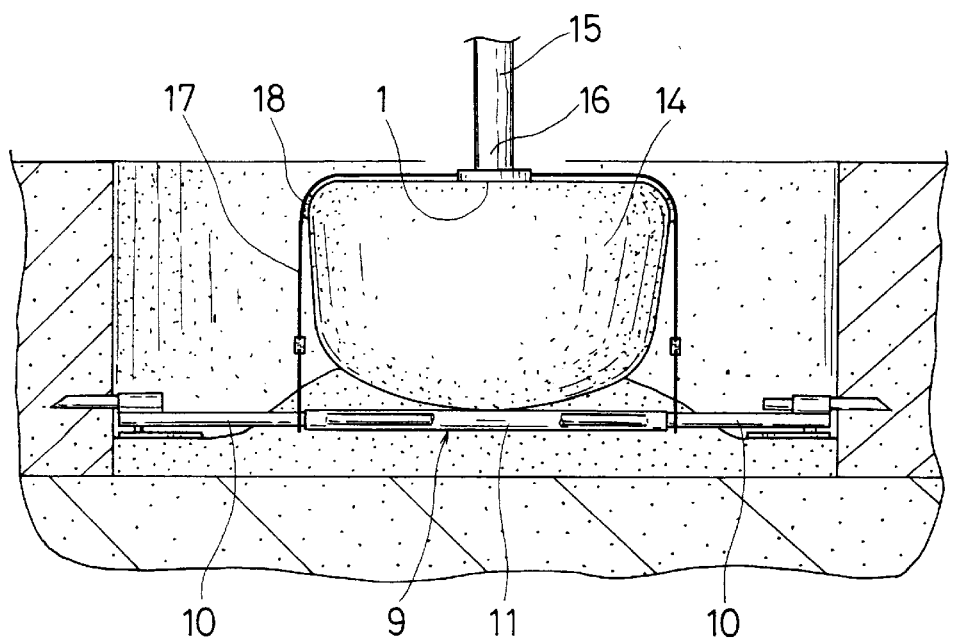
FIG. 7 is a partial cross sectional side view showing a state where the root pod is placed on the pod retainer.

After the piles 12 have been driven and thus the pod retainer 9 has been secured in the hole 6, a root pod 14 is placed on the pod retainer 9, as shown in FIG. 7. Then, a tension wire 17 is stretched between a base 16 of the tree 15 and the retainer body 11, specifically to the respective base portions of the slide rods 10, which are located just below the root pod 14. To prevent the root pod 14 from being bitten by the tension wire 17, protective pads 18 are attached to the respective shoulder portions of the root pod 14, as shown in FIGS. 7 and 8.

Figure 8:
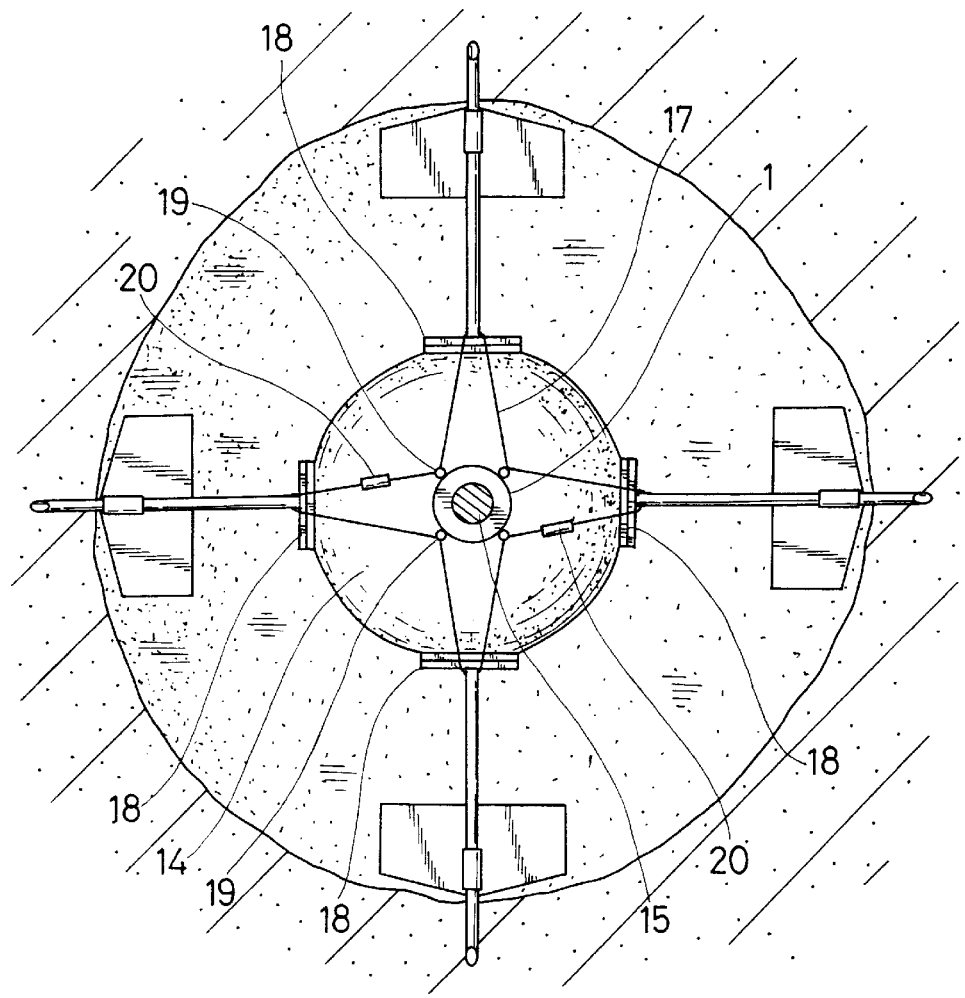
FIG. 8 is a partial cross sectional side view showing a state where the root pod is placed on the pod retainer.

When the base 16 of the tree 15 and the tension wire 17 are connected to each other, the support member 1 is wound around the base 16 of the tree 15, and then the tension wire 17 is stretched to respective fixing members 19 attached to the support member 1, as shown in FIGS. 7 and 8. In this case, the support member 1 is relatively loosely wound in such a manner as to prevent direct contact with the base 16 of the tree 15. Then, the tension wire 17 is strained by winches 20, turnbuckles or other stressing means so that the root pod 14 is supported by the tension force of the tension wire 17. Since the support member body 1a is of the flat-belt shape, the ends of the support member body 1a can easily be fastened together.

After the base 16 of the tree 15 has been supported as described above, soil or the like is introduced into the hole 6 so that the operation for supporting the tree 15 is completed.

The base of the supported tree 15 is gradually thickened as time elapses, thus resulting in that the support member 1 is wound around the base 16 of the tree 15 such that the support member 1 is in contact with the base 16. Since the support member body 1a is made of hemp and the protective member 4 is made of the thermoplastic polyurethane elastomer, which is a soft material, the support member 1 is unlikely to bite the tree 15.

After time has elapsed, the base 16 of the tree 15 is further thickened to be brought into contact with the support member 1. In this state, the base 16 is unlikely to withstand the tightening force effected by the support member 1. However, since the support member body 1a is made of hemp, which can be decomposed, and the protective member 4 is made of the thermoplastic polyurethane elastomer, the support member 1 gradually deteriorates as time elapses. Therefore, even if the diameter is enlarged, an adverse influence, such as the problem that the base 16 of the tree 15 is bitten by the support member 1, can satisfactorily be prevented.

Specifically, if the thermoplastic polyurethane elastomer is subjected to a hot and wet state for a long period of time, linkage of the polyol forming soft portions can easily be cut. Although cutting of the linkage does not immediately result in decomposition of the protective member 4, the physical properties of the protective member 4 deteriorates so that the protective member 4 gradually deteriorates.

Since hydrolysis is able to take place in the ester linkage of the polyester thermoplastic polyurethane elastomer, the cutting of linkages easily takes place as compared with the polyether thermoplastic polyurethane elastomer.

Moreover, the polyester thermoplastic polyurethane elastomer can be decomposed by microorganisms in a hot and wet state. The reason for this is believed to be caused by enzymes produced by microorganisms acting on the ester linkages in the portions of the polyester polyol.

As a result, the polyester thermoplastic polyurethane elastomer may deteriorate and decompose faster than required for the growth of the tree. In this viewpoint, the quantity of the polyester thermoplastic polyurethane elastomer is preferably limited to 10% by weight.

The polyurethane gradually deteriorates by ultraviolet rays.

Therefore, the protective member 4 gradually deteriorates due to synergistic effects of water, microorganisms in the earth, the temperatures, ultraviolet rays and the like.

Since the support member body 1a is made of hemp which can also be decomposed, the support member body 1a also gradually deteriorates.

Since both of the support member body 1a and the protective member 4 gradually deteriorate, the biting force of the support member 1 applied to the base 16 of the tree 15 can be weakened.

The support member 1 is allowed to deteriorate and is completely decomposed after a predetermined number of years has elapsed from the operation for supporting the tree.

When the roots of the tree have grown, the tree is able to stand in a self-supported manner. Therefore, even if the support member 1 does not exist, the standing tree is not adversely affected.

Since this embodiment results in the roots of the tree being allowed to grow when the support member 1 has been decomposed, the tightening force of the support member 1 does not result in base of the tree being bitten by the support member 1. Moreover, the tightening force can preferably be maintained.

Embodiment 2

In this embodiment, the thermoplastic polyurethane used is a mixture of 95% by weight of the polyether thermoplastic polyurethane and 5% by weight of polyester thermoplastic polyurethane. Since the other structures of the support member 1 are the same as those according to the first embodiment, the description for the same structures will be omitted.

Embodiment 3

In this embodiment, the thermoplastic polyurethane used is a mixture of 80% by weight of the polyether thermoplastic polyurethane with 20% by weight of the polyester thermoplastic polyurethane.

Since the other structures of the support member 1 are the same as those according to the first embodiment, the description for the same structures will be omitted.

Embodiment 4

In this embodiment, the thermoplastic polyurethane is solely composed of polyester thermoplastic polyurethane, and 5% by weight of anti-fungus agent is added. Thiabendazole is employed as the anti-fungus agent.

Since the other structures of the support member 1 are the same as those according to the first embodiment, the description for the same structures will be omitted.

Embodiment 5

In this embodiment, the thermoplastic polyurethane is solely composed of polyether thermoplastic polyurethane.

Since the other structures of the support member 1 are the same as those according to the first embodiment, the description for the same structures will be omitted.

Embodiment 6

Figure 9A:
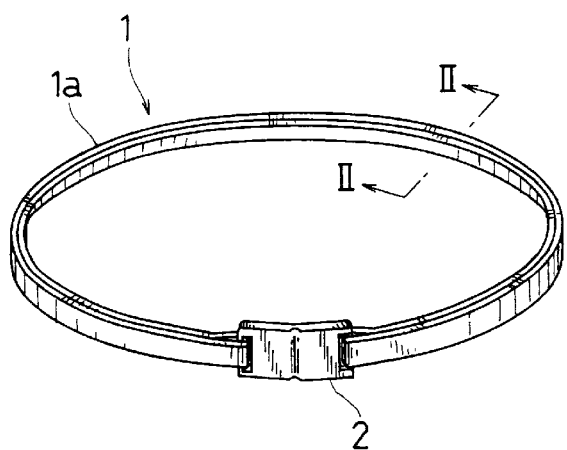
FIG. 9A is a schematic perspective view.
Figure 9B:
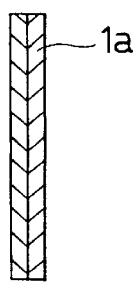
FIG. 9B is an enlarged cross sectional view taken along line II—II of FIG. 9A, respectively showing a support member in accordance with another embodiment of the present invention.

In this embodiment, the support member body 1a is made of synthetic resin. Moreover, a connection member 2 is attached to the support member body 1a in order to fix the two ends of the support member body 1a, as shown in FIG. 9. The connection member 2 according to this embodiment does not serve as the buckle according to the first embodiment, but is simply formed into an iron plate.

Figure 10:
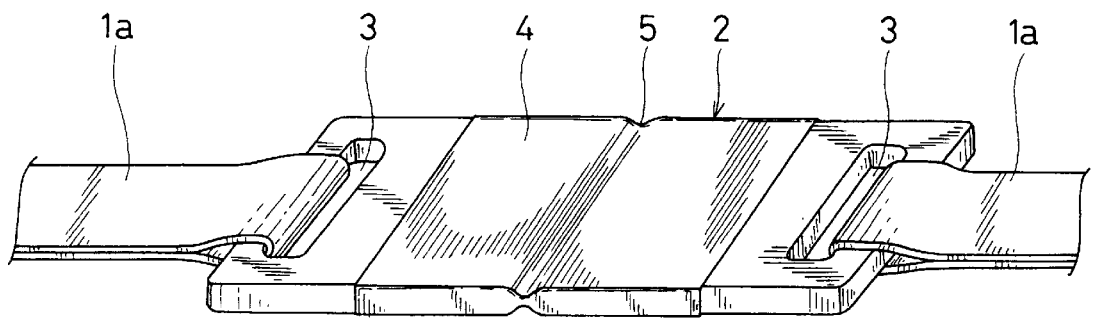
FIG. 10 is an enlarged perspective view showing an essential portion of a portion for fixing the support member body of FIG. 9.
Figure 11:
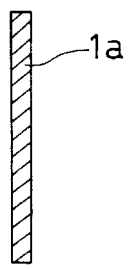
FIG. 11 is a cross sectional view showing a support member body in accordance with another embodiment.

The support member body 1a is formed so that the two ends of the support member body 1a are inserted into openings 3 formed at the two ends of the connection member 2 to be fixed together, as shown in FIG. 10. Reference numeral 4 represents a protective member made of elastic polymer and coated on the portion of the connection member 2 except for its two side portions. Thus, the support member body 1a is processed in such a manner as to deteriorate as the tree grows.

The elastic polymer is mixture of the polyether thermoplastic polyurethane elastomer and the polyester thermoplastic polyurethane elastomer in the same manner as the first embodiment. It is preferable that mixture ratio be such that the polyether thermoplastic polyurethane elastomer is 50 to 99% by weight and the polyester thermoplastic polyurethane elastomer is 1 to 50% by weight.

Reference numeral 5 represents a half-cut portion formed in substantially the central portion of the connection member 2 and having a substantially V-shape in section. The connection member 2 is arranged in such a manner as to be cut into pieces at the half-cut portion 5 after a predetermined period of time for the growth of the tree has elapsed.

In this embodiment, the protective member 4 made of the polyester thermoplastic polyurethane elastomer deteriorates after a predetermined number of years has elapsed, thus causing cracks to be generated in the protective member 4. As a result, the connection member 2 made of iron starts rusting.

After the connection member 2 has started rusting, the strength of the connection member 2 is gradually reduced. Since the half-cut portion 5 of the substantially V-shape is formed in substantially the central portion of the connection member 2, the connection member 2, which has gradually deteriorated as time has elapsed, loses its strength at the half-cut portion 5 having the smallest thickness. As a result, the connection member 2 is cut into pieces at the half-cut portion 5.

As a result, the tree 15 is released from the state where the support member 1 is wound around the tree 15. Thus, the tightening force applied to the tree is terminated. Therefore, even if the diameter of the tree is enlarged, the support member 1 is unlikely to bite into the base 16 of the tree 15 so that the biting force of the support member 1 can be weakened.

Since the connection member 2 is covered with the protective member 4, introduction of water and moisture into the connection member 2 can be prevented. Thus, the connection member 2 is not allowed to rust from the beginning. As a result, the required number of years for the connection member 2 to be cut into pieces are not undesirably shortened.

If the protective member 4 is unintentionally removed from the connection member, the connection member 2 cannot immediately be broken, since it is made of iron.

Other Embodiments

Although the above-mentioned embodiments are structured such that the thermoplastic polyurethane elastomer is derived from three raw materials including polyol, diol and diisocyanate, the components are not limited to these three raw materials.

Although the polyol according to a foregoing embodiments is the thermoplastic polyurethane elastomer containing polyether polyol and/or polyester polyol, a thermoplastic polyurethane elastomer containing another polyol may be employed. Also the mixture ratio of these components is not limited to the foregoing embodiments. It is preferable that the polyether thermoplastic polyurethane is 50 to 99% by weight and the polyester thermoplastic polyurethane is 1 to 50% by weight, more preferably the polyether thermoplastic polyurethane is 70 to 95% by weight and the polyester thermoplastic polyurethane is 5 to 30% by weight.

When only the polyester thermoplastic polyurethane is employed, the anti-fungus agent must be added as in the fourth embodiment. Although the quantity of the anti-fungus agent is not limited to 5% by weight as is limited in the fourth embodiment, it is preferable that the anti-fungus agent is contained between 0.1 to 15% by weight.

Also the type of the anti-fungus agent is not limited to the thiabendazole according to the fourth embodiment. For example, silver ions may be employed. Another anti-fungus agent may be employed.

Although the support member body 1a is made of hemp in the foregoing embodiments, the material of the support member body 1a is not limited to hemp. For example, the support member body 1a may be made of a decomposable material, such as cotton, jute, rice straw, paper, wool, silk, leather, wood or hemp palm. Mixture of two or more materials from among those materials may be employed. Therefore, mixed spinning of, for example, hemp and cotton may be employed to form the support member body 1a. In this case, the mixture ratio of hemp and cotton may be determined such that the quantity of cotton is 10% by weight with respect to 90% by weight of hemp, that of cotton is 20% by weight with respect to 80% by weight of hemp, that of cotton is 30% by weight with respect to 70% by weight of hemp, and that of cotton is 40% by weight with respect to 60% by weight of hemp.

When the mixed spinning of hemp and cotton is employed, it is preferable that the quantity of hemp is 50 to 100% by weight and that of cotton is 0 to 50% by weight.

The decomposable material for forming the support member body 1a may be photodecomposition material as well as the material which is naturally decomposed in the earth or the like. In this case, the support member body 1a may be formed by mixing the material, which is naturally decomposed, and the photodecomposition material together.

In a case where the support member body 1a is made of the decomposable material, only a portion of the support member body 1a may be made of the decomposable material in place of the structure in which the overall body of the support member body 1a is made of the decomposable material.

Although the structure, in which the support member body 1a is made of the decomposable material, is a preferred structure from the aspect of easy waste disposal and preventing environmental pollution, the support member body 1a is not always required to be made of the decomposable material in a case where a timer or a spring mechanism is provided to suspend the state where the tree is tightened after a predetermined time has elapsed. Therefore, the support member body 1a may be made of synthetic resin as is employed in the sixth embodiment as well as the above-mentioned decomposable materials.

As an alternative to this, for example, a chain, an iron member or a wire type metal member may be employed. If the support member body 1a is made of metal, such as iron, the support member body 1a can be decomposed due to rusting thereof.

As compared with metal materials, the structure in which the support member 1 is made of a natural fiber, such as hemp, is able to prevent the problem of the support member 1 undesirably biting the tree after the support member 1 has been wound around the base 16 of the tree 15.

The protective member 4 may be applied to the connection member 2 and the support member body 1a by a method except for coating.

Although the above-mentioned embodiments have the structure in which a tightening means is formed by coating the support member body 1a with the protective member 4 made of the thermoplastic polyurethane elastomer, the structure is not limited to this. The tightening means may be formed such that a portion of the support member body 1a is made of the thermoplastic polyurethane elastomer.

Although the foregoing embodiments have the structure such that elastomer is mainly employed as the thermoplastic polyurethane, plastomer may be employed.

To cause the support member body 1a to deteriorate in accordance with the growth of the tree, the thickness of the support member body 1a or the thickness of the protective member 4 with which the support member body 1a is coated is adjusted to adjust the time at which the state where the tree is tightened by the support member 1 is suspended.

Figure 13:
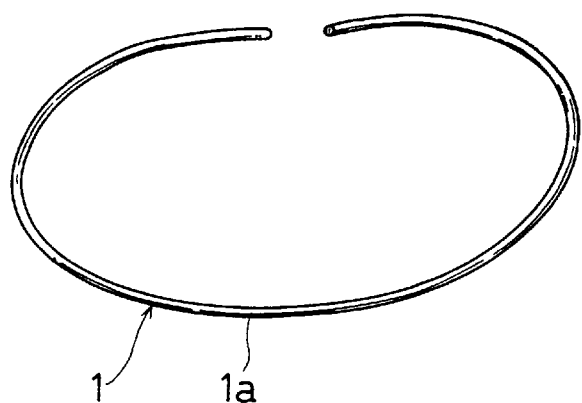
FIG. 13 is a schematic perspective view showing a support member in accordance with another embodiment.

Although the support member body 1a is, in the foregoing embodiments, coated with the protective member 4, another structure may be employed in which no protective member is provided and the support member is made of only a material such as hemp. Therefore, the structure, in which the support member body 1a is coated with the protective member 4, is not essential in the present invention. Although the above-mentioned preferred effect is obtained by forming the support member body 1a into the flat-belt shape, the support member body 1a is not limited to this shape. For example, a rod-like shape as shown in FIG. 13 may be employed, or a chain shape or a net shape support member body may be employed. As an alternative to this, the support member body may be formed into a harp (which is a musical instrument) like shape by disposing hairline members in the manner like a comb. In this shape, the overall body can be separated as a result of a portion of the multiplicity of the hairline members being is cut.

If the support member body 1a is formed into the flat-belt shape, an advantage can be realized in that the operation for connecting the ends of the support member body 1a can easily be performed. Since the support member body 1a is positioned with its lateral direction perpendicular to the upper surface of the root pod 14 at the time that the support member 1 has been wound around the base 16 of the tree 15, the width of the support member body 1a is smaller than the height of the support member body 1a. Therefore, the area where the support member body 1a is in contact with the root pod 14 can be reduced.

Figure 12:
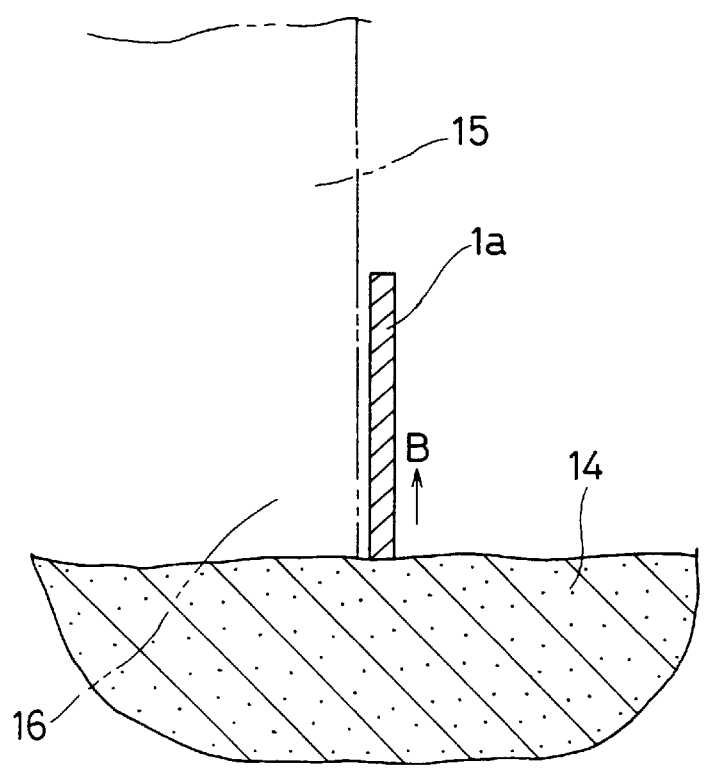
FIG. 12 is an enlarged cross sectional view showing an essential portion of a phenomenon in which water is upwards introduced into the support member body in accordance with the embodiment of FIG. 11.

Therefore, if water is contained in the root pod 14, it takes a long period of time for water to be introduced into the support member body 1a in a direction indicated by an arrow B, shown in FIG. 12. Thus, a period of time required for decomposition due to rot caused by water can be significantly elongated as compared with the structure in which the support member body 1a is formed into a rope shape and, therefore, undesirable rapid decomposition due to water can be prevented.

If the support member body 1a is formed into, for example, a rope shape, the support member body 1a must have a relatively large diameter in order to prevent undesirable rapid decomposition due to water. If the support member body 1a is formed into a flat-belt shape, the diameter of the support member body 1a is not needed to be enlarged. Thus, the quality of the appearance of the support member 1 can be maintained.

Moreover, the support member body 1a can be subjected to a water-proofing process or the water repellent process by coating the support member body 1a with wax.

Since the support member body 1a is subjected to a water-proofing process or a water repellent process by coating the support member body 1a with wax, introduction of water into the support member body 1a is somewhat prevented. As a result, undesirable rapid decomposition of the support member body 1a can be prevented.

Decomposition of the natural fiber, such as hemp, forming the support member body 1a is caused by ultraviolet rays, microorganisms in the earth, water and the like. However, the water-proofing process or the water repellent process enables the decomposition speed of the support member body 1a to be reduced.

In this embodiment, a period of time required for the support member 1 to be decomposed was prolonged to about five years after the support member 1 was installed.

Although the above-mentioned embodiment is structured such that the support member body 1a is coated with wax as the water-proofing or the water repellent process, the water-proofing or water repellent process is not limited to wax coating. For example, paste, pine resin, tar, vegetable oil, silicon oil or silicon resin may be employed in place of wax.

As an alternative to coating, impregnation means may be employed. The means for applying the materials as mentioned above to the support member body 1a may arbitrarily be changed to be adaptable to the type of the material being applied.

In place of the water-proofing or water repellent process, a process corresponding to, for example, ultraviolet rays or microorganisms may be employed. That is, the support member body 1a is required to be subjected to a process with which the decomposition time can be prolonged to be adaptable to growth of the tree.

The expression "the decomposition time can be elongated to be adaptable to the growth of the tree" means that decomposition time can be prolonged until the roots of the tree grow to a proper size. The period of time has a certain width in the present invention.

Although the half-cut portion 5 is formed in substantially the central portion of the connection member 2 in the second embodiment, the position of the half-cut portion 5 is not limited to this. The half-cut portion 5 may be disposed at an arbitrary position of the connection member 2.

A mechanical means, for example, a time-limit device having a timer, may be provided. The timer detects a lapse of a predetermined time and a portion of the time-limit device is removed to suspend the state where the tree is wound by the support member body 1a in a time-limit manner.

The time-limit device may include a spring or the like so that the time-limit device is operated after a predetermined period of time has elapsed to suspend or delay the state where the support member body 1a is wound around the tree.

Suspension means may be a mechanism or a material, such as a seat belt for a vehicle, which is stopped with an instantaneous and large force and which is extended with a small and continuous force.

The description "the state where the tree is wound can be suspended after a lapse of years in accordance with growth of the tree" means that the approximate suspension time is expected to suspend the state of winding so that the state of winding is suspended after the roots of the tree have properly grown.

For example, the first embodiment is structured such that the thickness of the support member body 1a is adjusted or the thickness of the protective member 4 to be used to coat the support member body 1a is adjusted to adjust the time at which the state of winding is suspended.

The sixth embodiment is able to adjust the time at which the state, in which the tree is wound by the support member 1 is suspended, by adjusting the thickness of the portion of the connection member 2 in which the half-cut portion 5 is formed.

Separating means may be provided on the support member body 1a so that the separating means is pressed by the base 16 of the growing tree 15 so as to be operated to divide the support member body 1a. Since this structure is formed such that the tree operates the separating means to separate the support member, the support member is pressed and operated by the base 16 of the growing tree 15. That is, the structure is arranged such that the enlargement of the diameter of the base 16 causes the base 16 to press and operate the separating means. Therefore, the support member 1 can reliably be separated when the grown tree 15 comes in contact with the support member 1.

As a result, the problem that the support member 1 bites the tree can reliably be prevented. When the separating means is operated, the roots of the tree have been spread in the earth. Thus, the tree is unlikely to be subject to the influence caused by the loss of the supporting effect of the support member 1.

It is preferable that the separating means include a blade 23 which is capable of cutting the support member body 1a. The reason is that the cutting means including the blade 23 does not need a complicated mechanical structure, and thus the structure can be simplified. Therefore, the means is free from a fault even if the means is embedded in the earth for a long period of time.

Figure 14:
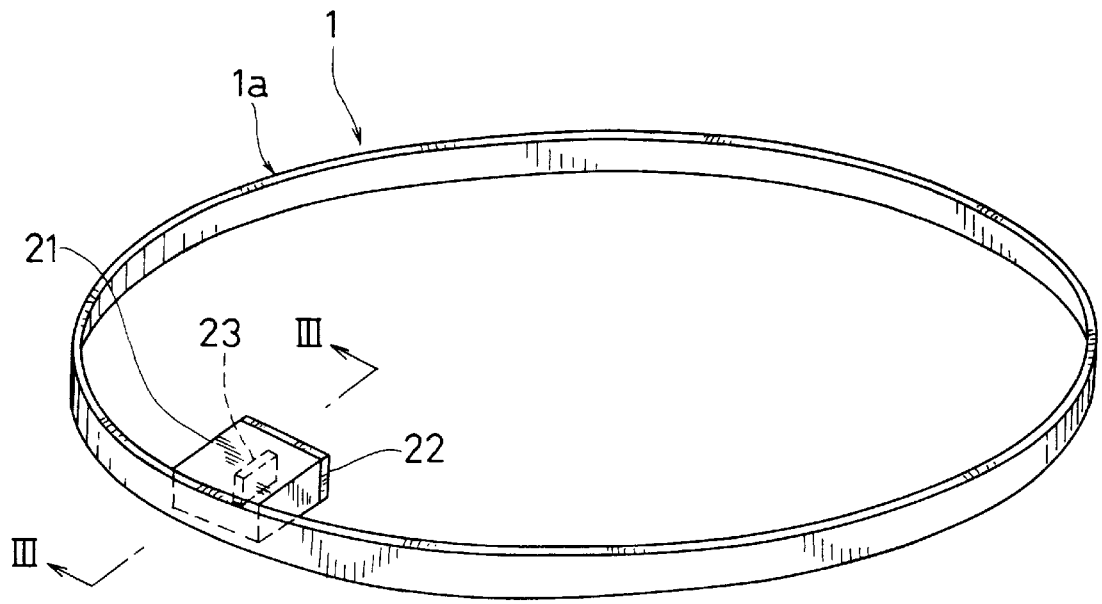
FIG. 14 is a schematic perspective view showing a support member in accordance with another embodiment.
Figure 15:
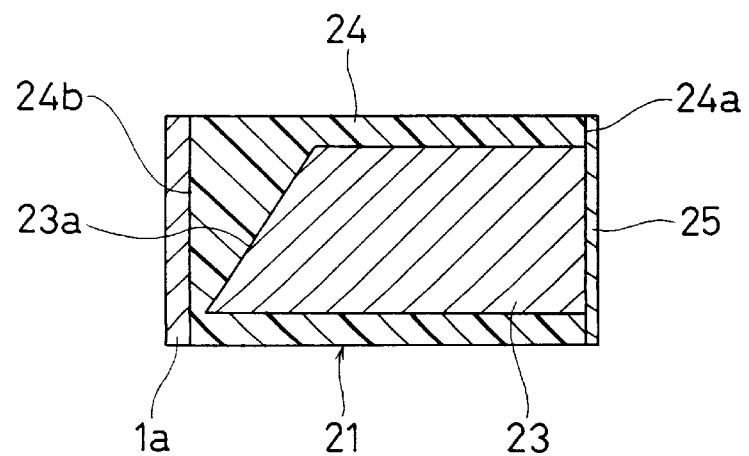
FIG. 15 is an enlarged cross sectional view taken along line III—III of FIG. 14.

Specifically, the support member 1, as shown in FIG. 14, includes the support member body 1a, which is wound around the base of the tree and a separating means 21 provided on the support member body 1a. As shown in FIG. 15, the separating means 21 includes the blade 23 having a cutting part 23a, which is capable of cutting the support member body 1a, and preferably is made of a material which is unlikely to rust, such as stainless steel.

More specifically, the separating means 21 includes a metal plate member 25 provided for a surface 24a of a buffer member 24 formed by molding expanded polystyrene into a substantially rectangular-parallelopipe shape and the blade 23 disposed to project vertically from substantially the central portion of the metal plate member 25 and having a sharp cutting part 23a formed at the leading end thereof. The separating means 21 is secured to the support member body 1a in such a manner that another surface 24b of the buffer member 24, that is, the surface 24b to which the cutting part 23a of the blade 23 faces, abuts against the support member body 1a.

The support member 1 having the above-mentioned structure is wound around the base 16 of the tree 15 in the same manner as that of the above-mentioned embodiments, where direct contact is prevented between the base 16 and the support member 1.

After time has elapsed and the diameter of the base 16 of the tree 15 has been enlarged because the tree 15 has grown, the base 16 comes in contact with the plate-like member 25 of the separating means 21.

After the base 16 has been further enlarged, the base 16 presses the metal plate member 25 of the separating means 21. Thus, the buffer member 24 is pressed and crushed between the support member body 1a and the base 16, thus causing the cutting part 23a of the blade 23 to start contact with the support member body 1a. After the base 16 has further grown, the blade 23 is pressed to the support member body 1a until the support member body 1a is cut by the blade 23. Therefore, the enlarged base 16 of the grown tree 15 is not pressed by the support member 1. As a result, the problem that the growth is obstructed can be overcome.

When the tree 15 has grown to a degree that the support member 1 bites into the base 16 of the tree 15, the tree 15 cuts the support member body 1a. Therefore, premature cutting of the support member 1 before the tree 15 grows satisfactorily can be prevented. As a matter of course, the support member 1 does not bite into the base 16 of the tree 15.

Although the buffer member 24 according to this embodiment is made of expanded polystyrene, the buffer member 24 is not limited to the expanded polystyrene. The buffer member 24 may be made of another expanded material, for example, expanded urethane or bellows which can be expanded/contracted.

In this embodiment, the blade 23 is made of a material, such as stainless steel, which does not easily rust, and thus an advantage can be realized in that the blade 23 does not easily rust even if it is embedded in the earth and sharpness required to cut the support member body 1a can be maintained. However, the blade 23 is not always required to be made of a material, such as stainless steel, which does not easily rust.

Figure 16:
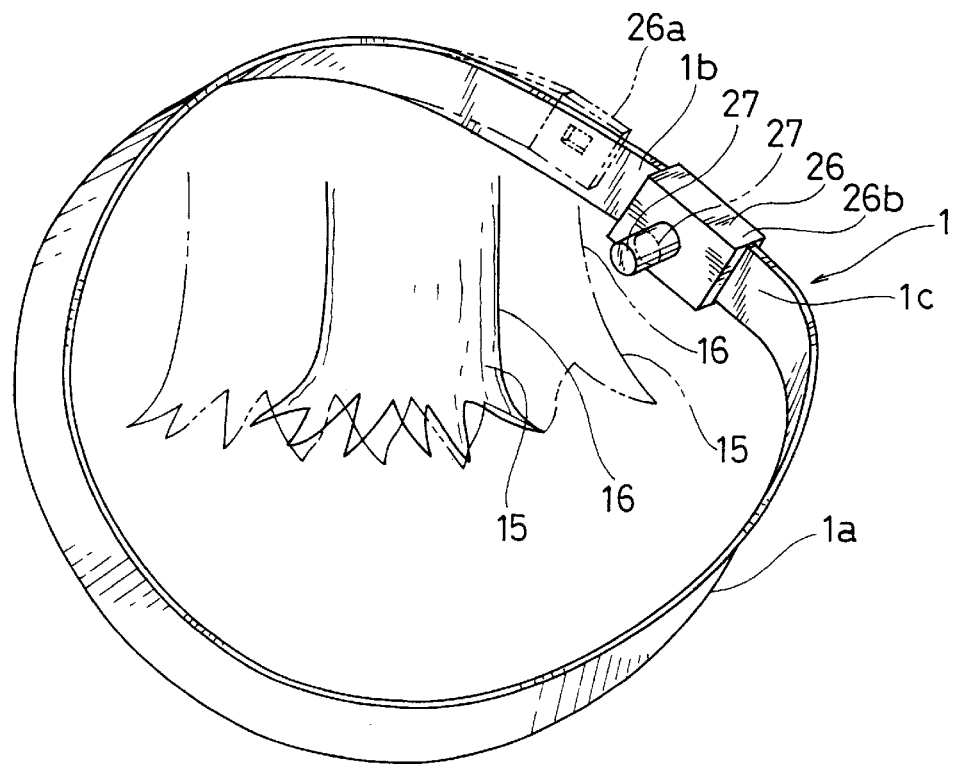
FIG. 16 is a schematic perspective view showing a support member in accordance with another embodiment.

Also the separating means 21 is not limited to a structure according to the above-mentioned embodiment in which the blade 23 cuts the support member body 1a. For example, the separating means may includes a connection member 26 for connecting the flat-belt shape support member body 1a, as shown in FIG. 16. More specifically, an engagement portion 26a is provided at an end 1b of the flat-belt shape support member body 1a, while another engagement portion 26b, which is engageable to the engagement portion 26a, is provided at another end 1c. A suspension button 27 for permitting the engagement portion 26b to release the engaging relationship with the engagement portion 26a is formed in such a manner as to project towards the base 16 of the tree 15.

The support member 1 having the above-mentioned structure is formed into an annular shape via the connection member 26, and then wound around the base 16 of the tree 15 in the same manner as that of the above-mentioned embodiments so that the tree can be stood erect.

After years has elapsed and the tree 15 have grown, the base 16 of the tree 15 presses the suspension button 27 of the connection member 26 so that the engagement of the engagement portion 26b is terminated. As a result, the support member body 1a is changed from the annular shape to the flat-belt shape. That is, the support member body 1a is separated by the base 16 of the tree 15 so that the support member 1 does not bite into the base 16 of the tree 15 (as indicated by an alternate long and two short dashes line shown in FIG. 16).

A plurality of the separating means 21 may be provided.

Although the piles 12 are driven into the inner wall 13 of the hole 6 for receiving the tree 15, the present invention is not limited to the piles 12. For example, members for pressing the inner wall 13 may be attached to the slide rods 10 to press the inner wall 13.

Figure 17:
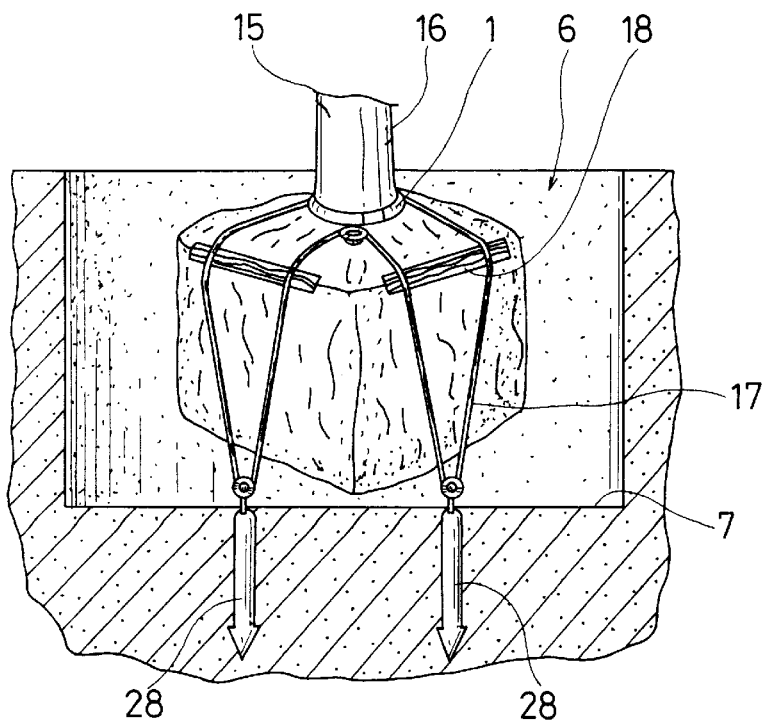
FIG. 17 is a schematic perspective view with a partial cross section showing another embodiment of the operation for supporting a tree.

Although the foregoing embodiments have the structure such that the root pod 14 is placed on the pod retainer 9 and the rope 17 caused to run on the root pod 14 is secured to the pod retainer 9 so that the tree is supported and secured, the means for supporting and securing the tree is not limited to this. As an alternative to the pod retainer 9, a structure as shown in FIG. 17 may be employed in which the rope 17 is fixed to an anchor 28 driven into the bottom surface 7 of the hole 6 in order to support and secure the tree.

Although the foregoing embodiments have the structure in which the wire-like rope 17 is used to secure the root pod 14, the rope 17 is not limited to the wire type member. For example, a plate-like member as shown in FIG. 18 may be employed.

Figure 18:
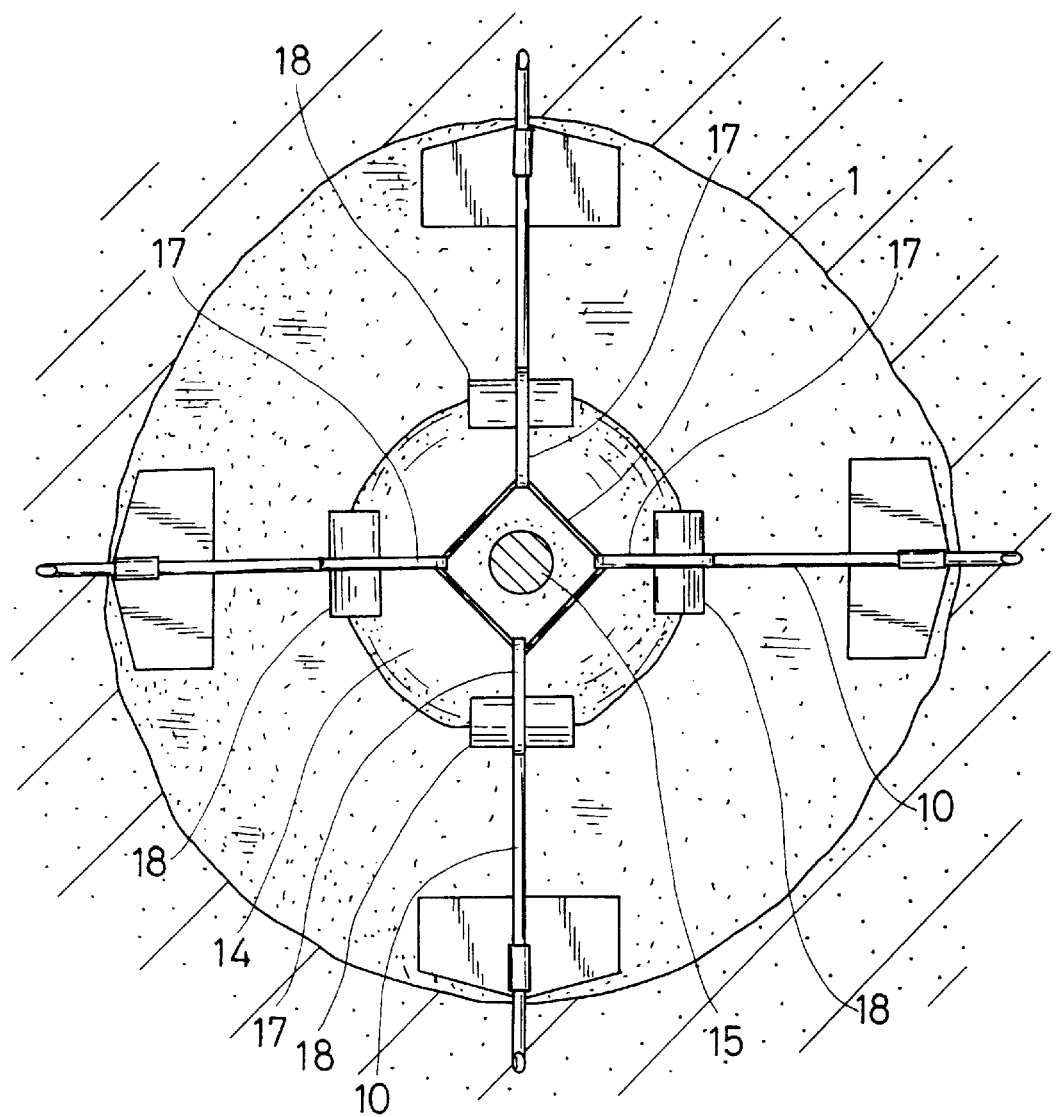
FIG. 18 is a partial cross sectional schematic perspective view showing another embodiment of the operation for supporting a tree.

In the embodiment shown in FIG. 18, each of four plate-like member 17 is arranged to the support member 1 and the retainer body 11 (more specifically, each of the base portions of the slide rod 10).

Although the rope 17 is wound around the root pod 14 to support and secure the tree, rod-like members each having a pressing plate may be driven into the earth at positions around the root pod 14 and the pressing plates disposed in the upper portions of the rod-like members are used to press the root pod 14 so as to support and secure the root pod 14. Accordingly, the present invention is not limited to the method of supporting and securing the tree as described above.

Although the above-mentioned embodiments have the structure such that the support member 1 is wound around the base 16 of the tree 15 to support the same, the means for supporting the base 16 of the tree 15 is not limited to this means. For example, a structure as shown in FIG. 19 may be employed in which the ropes 17 are arranged to intersect at the base of the tree in such a manner that the intersection portions 17a and 17b of the ropes 17 surround the base 16 of the tree 15.

Also in this case, the grown tree comes in contact with the intersection portions 17a and 17b of the rope 17 so as to be tightened and supported after the diameter of the trunk of the tree has been enlarged.

In this case, a portion of the rope 17 is cut in a time limit manner to suspend the state of tightening the base of the tree or a winch (not shown) attached to the rope 17 is removed from the rope 17 in a time limit manner to suspend the foregoing state.

Figure 19:
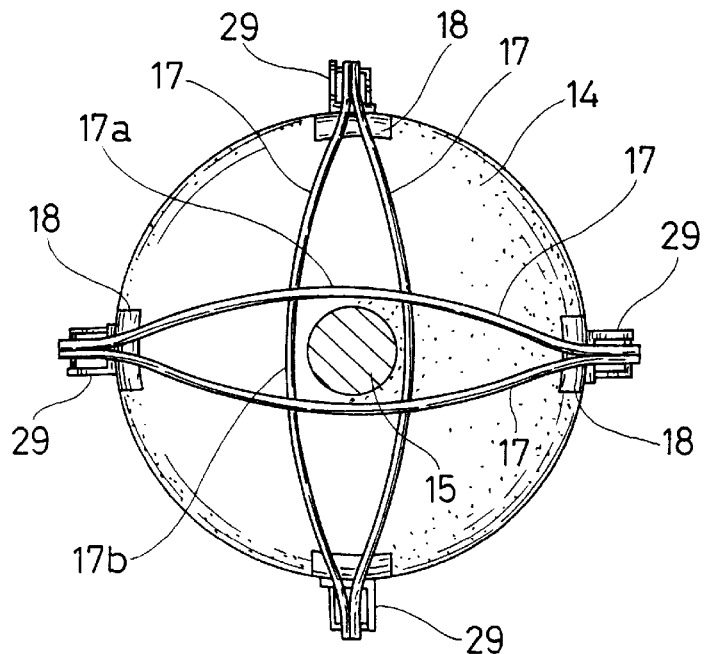
FIG. 19 is a schematic plan view showing another embodiment of the operation for supporting a tree.

In FIG. 19, reference numerals 18 respectively represent shoulder pads and 29 respectively represent angles driven into the earth at positions around the root pod 14.

Figure 20:
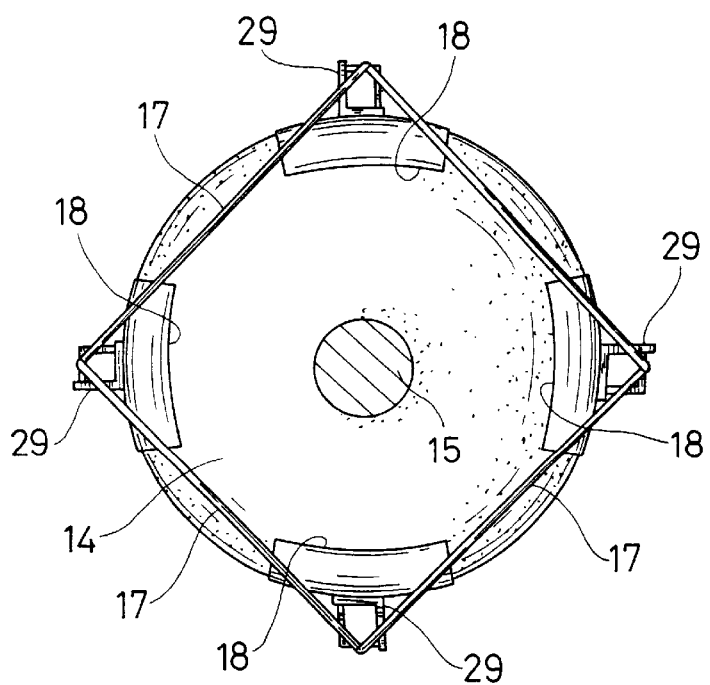
FIG. 20 is a schematic plan view showing another embodiment of the operation for supporting a tree.

A structure as shown in FIG. 20 may be employed in which the rope 17 is arranged between adjacent angles 29 to secure the root pod 14.

Although the above-mentioned embodiments have the structure such that the support member 1 is disposed apart from the base 16 of the tree 15 and disposed above the root pod, the support member 1 may be wound around the base 16 in such a manner that the support member 1 is in contact with the base 16 of the tree 15.

In this case, the support member 1 is pressed and supported by the base 16 of the tree 15.

This specification is by no means intended to restrict the present invention to the preferred embodiments set forth therein. Various modifications to the support member for supporting the base of a tree, and method of a tree supporting operation of the present invention, as described herein, may be made by those skilled in the art without departing from the spirit and scope of the present invention as defined in the appended claims.

What is claimed is:

1. A support member for supporting the base of a tree for use in an operation for supporting the tree such that said support member tightens around the base of the tree to support the tree, said support member comprising a portion formed at least in part from a decomposable thermoplastic polyurethane wherein said thermoplastic polyurethane is a mixture of polyether thermoplastic polyurethane containing polyether polyol or polyester thermoplastic polyurethane containing polyester polyol and polyether thermoplastic polyurethane, said support member capable of self-termination of support at the base of the tree in a time-dependent manner after a lapse of years corresponding to growth of the tree.

2. A support member according to claim 1 wherein said support member comprises a support member body formed at least in part from said decomposable thermoplastic polyurethane.

3. A support member for supporting the base of a tree according to claim 2, wherein said thermoplastic polyurethane comprises 50 to 99% by weight of polyether thermoplastic polyurethane and 1 to 50% by weight of polyester thermoplastic polyurethane.

4. A support member according to claim 1 wherein said support member comprises a support member body and a protective member covering said support member body, said protective member being formed at least in part from said decomposable thermoplastic polyurethane.

5. A support member for supporting the base of a tree for use in an operation for supporting the tree according to any one of claims 1 to 4, wherein said decomposable material for forming said support member body is hemp, cotton, jute, rice straw, paper, wool, silk or leather.

6. A support member for supporting the base of a tree for use in an operation for supporting the tree according to any one of claims 2 or 4, wherein said support member body is formed into a flat-belt shape.

7. A support member for supporting the base of a tree according to claim 4, wherein said thermoplastic polyurethane comprises 50 to 99% by weight of polyether thermoplastic polyurethane and 1 to 50% by weight by polyester thermoplastic polyurethane.

8. A support member for supporting the base of a tree for use in an operation for supporting the tree according to claim 4, wherein said decomposable material for forming said support member body is a mixed spun product of hemp and cotton, wherein said decomposable material for forming said support member body is mixed of hemp and cotton.

9. A support member for supporting the base of a tree for use in an operation for supporting the tree according to claim 1, wherein said decomposable material for forming said support member body is a mixed spun product of hemp and cotton.

10. A support member for supporting the base of a tree for use in an operation for supporting the tree according to claim 1, wherein said support member made of the decomposable material is subjected to a process with which the decomposition time can be prolonged to correspond to the years of growth of the tree.

11. A support member for supporting the base of a tree for use in an operation for supporting the tree according to claim 10, wherein said process with which the decomposition time can be prolonged to correspond to the years of growth of the tree is a water-proofing process or a water repellency creating process.

12. A support member for supporting the base of a tree for use in an operation for supporting the tree according to claim 11, wherein said water-proofing process or said water repellent process is performed by impregnating or applying wax, paste, pine resin, tar, vegetable oil, silicone oil or silicone resin to said support member.

13. A support member for supporting the base of a tree for use in an operation for supporting the tree according to claim 1, wherein said support member body is provided with separating means, and said separating means is arranged to be pressed by the base of the growing tree so as to be operated to separate said support member body.

14. A support member for supporting the base of a tree for use in an operation for supporting the tree such that said support member tightens around the base of the tree to support the tree, said support member comprising:
a support member capable of self-termination of support at the base of the tree in a time-dependent manner after a lapse of years corresponding to growth of the tree, said support member comprising a support member body and a protective member covering said support member body, said protective member being formed from a thermoplastic polyester polyurethane and an antifungus agent.

15. A support member for supporting the base of a tree according to claim 14, wherein said anti-fungus agent is contained by 0.1 to 15% by weight.

16. A method of supporting a tree such that the base of the tree is tightened so as to be supported, said method comprising placing a support member around the base of the tree to support the tree, said support member having a support member body capable of terminating support at the base of the tree in a time-dependent manner to correspond to growth of the tree, wherein said support member body is provided with separating means arranged to be pressed by the base of the tree so as to be operated for separating said support member body.

17. A method of a tree supporting operation according to claim 16, wherein said support member body is made of a decomposable material.

18. A method of a tree supporting operation according to claim 17, wherein said decomposable material for forming said support member body is hemp, cotton, jute, rice straw, paper, wool, silk or leather.

19. A method of a tree supporting operation according to claim 17, wherein said decomposable material for forming said support member body is a mixed spin product of hemp and cotton.

20. A method of a tree supporting operation according to claim 17, wherein said support member body made of the decomposable material is subjected to a process with which the decomposition time can be prolonged to correspond to the years of growth of the tree.

21. A method of a tree supporting operation according to claim 20, wherein said process with which the decomposition time can be prolonged to correspond to the years of growth of the tree is a water-proofing process or a water repellent process.

22. A method of a tree supporting operation according to claim 21, wherein said water-proofing process or said water repellent process is performed by impregnating or applying wax, paste, pine resin, tar, vegetable oil, silicon oil or silicon resin to said support member body.

23. A method of a tree supporting operation according to claim 16, wherein said support member is covered with a protective member which is able to deteriorate to correspond to the years of growth of the tree and said support member body is made of a decomposable material.

24. A method of a tree supporting operation according to claim 23, wherein said protective member which is able to deteriorate to correspond to the years of growth of the tree is made of thermoplastic polyurethane.

25. A method of a tree supporting operation according to claim 24, wherein said thermoplastic polyurethane is mixture of polyether thermoplastic polyurethane containing polyether polyol or polyester thermoplastic polyurethane containing polyester polyol and polyether thermoplastic polyurethane.

26. A method of a tree supporting operation according to claim 25, wherein said thermoplastic polyurethane comprises 50 to 99% by weight of polyether thermoplastic polyurethane and 1 to 50% by weight of polyester thermoplastic polyurethane.

27. A method of a tree supporting operation according to claim 24, wherein said thermoplastic polyurethane comprises polyester thermoplastic polyurethane and an antifungus agent added thereto.

28. A method of a tree supporting operation according to claim 27, wherein said anti-fungus agent is contained by 0.1 to 15% by weight.

29. A method of a tree supporting operation according to claim 16, wherein at least a portion of said support member contains thermoplastic polyurethane.

30. A method of a tree supporting operation according to claim 16, wherein at least a portion of said support member body is made of a decomposable material which can be decomposed to correspond to the years of growth of the tree.

31. A method of a tree supporting operation according to claim 16, wherein said support member includes a connection member, which can be separated in a time-dependent manner to correspond to the years of growth of the tree, is attached to said support member body.

32. A method of a tree supporting operation according to claim 31, wherein said connection member is formed by a plate-like member made of iron and having a half-cut portion.

33. A method of a tree supporting operation according to claim 16, wherein said support member includes a time-limit device having a timer.

34. A method of a tree supporting operation according to of claim 16, wherein said support member body is formed into a flat-belt shape.

35. A support member for supporting the base of a tree for use in an operation for supporting the tree such that said support member tightens around the base of the tree to support the tree and is capable of self-termination of support at the base of the tree in a time-dependent manner after a lapse of years corresponding to growth of the tree, said support member comprising:

a connection member secured to said support member body, said connection member being a plate-like member made of iron and having a grooved portion capable of separation in a time-dependent manner.

36. A support member for supporting the base of a tree for use in an operation for supporting the tree such that said support member tightens around the base of the tree, said support member comprising:

a support member body capable of self-termination of support at the base of the tree in a time-dependent manner after a lapse of years corresponding to growth of the tree, wherein the support member body includes a timer.

37. A support member for supporting the base of a tree for use in an operation for supporting the tree such that said support member tightens around the base of the tree, said support member being capable of self-termination of support at the base of the tree in a time-dependent manner after a lapse of years corresponding to growth of the tree, and comprising:

a support member body and secured to said support body is a separating means, and said separating means is arranged to be pressed by the base of the growing tree to separate said support member body.

* * * * *